United States Patent [19]

Yasuda et al.

[11] 4,232,290
[45] Nov. 4, 1980

[54] HANDWRITTEN CHARACTER IDENTIFICATION

[75] Inventors: Syoichi Yasuda, Nara; Yoshiki Nishioka, Tenri, both of Japan

[73] Assignee: Sharp Kabushiki Kaisha, Osaka, Japan

[21] Appl. No.: 924,362

[22] Filed: Jul. 13, 1978

Related U.S. Application Data

[63] Continuation-in-part of Ser. No. 814,419, Jul. 11, 1977, abandoned, which is a continuation of Ser. No. 579,578, May 21, 1975, abandoned.

[30] Foreign Application Priority Data

May 21, 1974 [JP] Japan .................................. 49/57643

[51] Int. Cl.³ .............................................. G06K 9/50
[52] U.S. Cl. ............................................ 340/146.3 Z
[58] Field of Search ................ 340/146.3 Z, 146.3 A, 340/146.3 R, 146.3 J, 146.3 Y

[56] References Cited

U.S. PATENT DOCUMENTS

| | | | |
|---|---|---|---|
| 2,964,734 | 12/1960 | West | 340/146.3 Z |
| 3,058,093 | 10/1962 | Vernon et al. | 340/146.3 Z |
| 3,108,254 | 10/1963 | Dimond | 340/146.3 Z |
| 3,123,804 | 3/1964 | Kamentsky | 340/146.3 R |
| 3,852,715 | 12/1974 | Morimoto | 340/146.3 Z |
| 4,092,631 | 5/1978 | Suzuki et al. | 340/146.3 J |

*Primary Examiner*—Joseph M. Thesz
*Attorney, Agent, or Firm*—Birch, Stewart, Kolasch & Birch

[57] ABSTRACT

Handwritten character identification employs two constraining dots and radius vectors extending out from each of these dots in a manner to identify large quantities of numeral characters by determining which of these radius vectors are crossed, whereby these crossings sample a predetermined segmented character font pattern to designate the presence and absence of the respective segments. In particular, the number of the radius vectors concerning the horizontally-oriented segments is increased to minimize a possibility of error while leaving the two constraining dots to keep mild restrictions on the size and form of the characters to be handwritten and identified.

13 Claims, 16 Drawing Figures

| | Sa | Sb | Sc | Sd | Se | Sf | Sg | Sh | Si | Sj |
|---|---|---|---|---|---|---|---|---|---|---|
| 0 | 1 | 0 | 1 | 1 | 0 | 1 | 1 | 1 | 1 | 1 |
| 1 | 0 | 0 | 0 | × | × | × | 0 | 0 | 1 | 1 |
| 2 | × | 1 | 1 | 1 | 1 | × | 0 | 1 | 1 | 0 |
| 3 | × | × | 1 | 1 | 1 | 1 | 0 | 0 | 1 | 1 |
| 4 | × | 1 | 0 | 0 | 1 | × | 1 | 0 | 1 | 1 |
| 5 | 1 | 1 | 1 | 1 | 1 | 1 | 1 | 0 | 0 | 1 |
| 6 | × | 1 | 1 | 0 | 1 | 1 | 1 | 1 | 0 | 1 |
| 7 | 1 | 0 | 0 | 1 | 0 | × | 0 | 0 | 1 | 1 |
| 8 | 1 | 1 | 1 | 1 | 1 | 1 | 1 | 1 | 1 | 1 |
| 9 | 1 | 1 | 0 | 1 | 1 | × | 1 | 0 | 1 | 1 |

HANDWRITTEN CHARACTER IDENTIFICATION

This application is a Continuation-In-Part of copending application Ser. No. 814,419, filed July 11, 1977, of Syoichi Yasuda et al, for HANDWRITTEN CHARACTER IDENTIFICATION now abandoned, which in turn, is a Continuation of application Ser. No. 579,578 filed May 21, 1975, the latter now being abandoned.

BACKGROUND OF THE INVENTION

The present invention relates generally to an optical character reading system (OCR), and more particularly pertains to improvements in a character recognition and identification system where inherent characteristic of respective characters are determined and sensed in order to provide the identity of the respective characters by utilization of constraining dots and radius vectors.

Figure 1A:
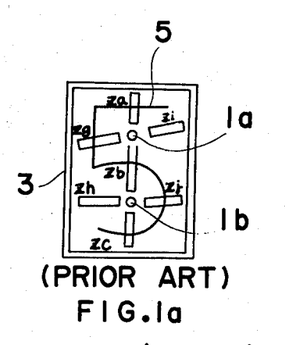
FIGS. 1a and 1b are schematic illustrations showing the basic principle of T. L. Dimond's prior art method.

The article "Reading Handwritten Characters" by Dimond, T. L.: Bell Laboratories Record, Jan. 1958, pp 34–35, discusses a method of reading and recognizing handwritten characters of a type of interest in the present application. As illustrated in FIG. 1a, pursuant to teachings of Dimond's method there were provided 2-dot constraints $1a$, $1b$ to guide the formation of characters to be handwritten and a predetermined number (seven in this instance) of radius vectors $Z_a$, $Z_b$, $Z_c$, $Z_g$, $Z_h$, $Z_i$ and $Z_j$ which extend out from each of these constraining dots $1a$, $1b$. The respective characters are identified by combinations of crossings where these radius vectors are crossed by that character since each of the characters has a unique set of crossings. By way of example, the character "5" is recognized and identified as below.

$$"5" = Z_a \cdot Z_b \cdot Z_c \cdot Z_g \cdot \overline{Z_h} \cdot \overline{Z_i} \cdot Z_j \tag{1}$$

The above discussed method has the advantages of being simpler in construction and design than any other recognition method.

Figure 1B:
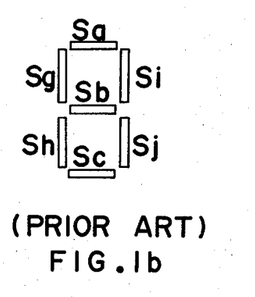

Such a method, therefore, has been employed over a wide range of OCR's. In practice, such a method is accomplished by sampling and normalizing the characters in the well known segmented font (for example, such as the seven-segmented font made up of seven segments $S_a$, $S_b$, ... $S_j$ as depicted in FIG. 1b) rather than recognizing the inherent characteristics of the respective characters.

Figure 2A:
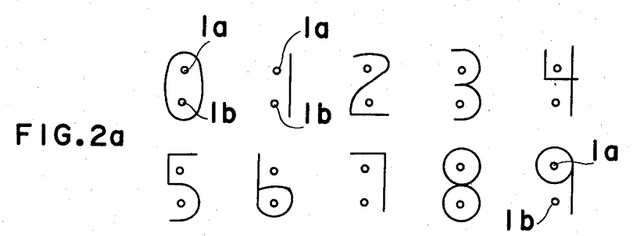
FIGS. 2a, 2b and 2c are schematic illustrations for the purpose of explanation of the shortcomings of the Dimond's prior art methods.

The handwritten characters must be restricted in their size and form by means of the constraining dots $1a$ and $1b$ and outline 3 and be marked on a suitable medium such as a ticket in accordance with the typical pattern examples illustrated in FIG. 2a. Nevertheless, the handwritten characters thus obtained vary in size and form due to individual differences.

Figure 2B:
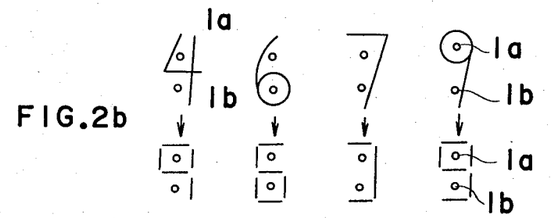

For example, as suggested in FIG. 2b no distinction between the characters "4" and "9" will be sensed to provide a possibility of error, and the character "7" will be vague and undefined for recognition and identification requirements. Although the characters "6" and "9" are distinguishable, their humming distance to the character "8" is only one thereby providing a possibility of misjudgement.

Accordingly, auxiliary characteristic recognition methods such as geometrical characteristic recognition as to the crossings and loops of the respective characters have been proposed to overcome the shortcomings set forth above. These methods, however, need a discrete circuit arrangement and render their implementations complex.

Figure 2C:
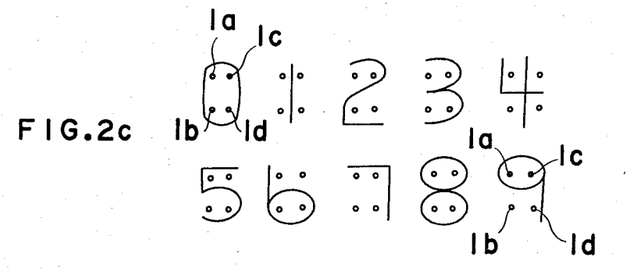

In addition, as illustrated in FIG. 2c, a more powerful approach has been suggested, which approach employs four constraining dots $1a$, $1b$, $1c$ and $1d$ within the outline 3 for constraining more severely the formation of the handwritten characters, thereby alleviating individual differences. This does not permit the formation of the smaller characters and hence improvements in information density of the medium.

SUMMARY OF THE INVENTION

The present invention, therefore, may provide a character recognition system and method which utilizes a specific segmented font in sampling and normalizing handwritten characters to tolerate possible various variations in the formation of the handwritten characters to be recognized and identified.

DESCRIPTION OF THE PREFERRED EMBODIMENTS

Figure 3A:
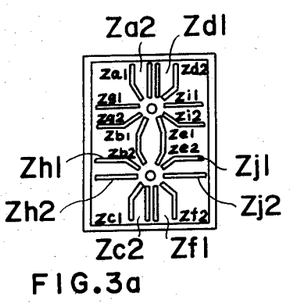
FIGS. 3a and 3b are schematic illustrations showing the basic principle of the present invention method.
Figure 3B:
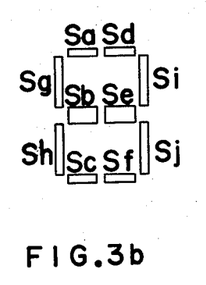
Figure 4:
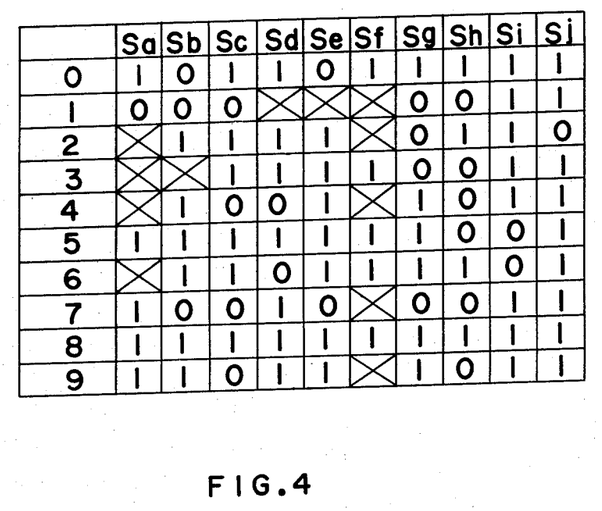
FIG. 4 is a truth table showing character recognition logic in one of the preferred embodiments of the present invention.

The typical character segmented font as illustrated in FIG. 3b is a modification of that illustrated in FIG. 1b. It will be noted that each of the horizontally oriented segments $S_a$, $S_b$ and $S_c$ of FIG. 1b are divided into two sub-segments $S_a$ and $S_d$, $S_b$ and $S_e$ and $S_c$ and $S_f$ for the purpose of attaining the objective of the present invention. FIG. 4 illustrates judgment logic for determining the numerical characters "0" through "9" in accordance with the segmented font pattern as illustrated in FIG. 3b. In the given designation, "1" represents the presence of the respective segments $S_a$, $S_b$, $S_c$ ... $S_j$, "0" represents the absence thereof and "X" represents the blank where the associated segments are not used for determinations of the handwritten characters.

Analysis of FIG. 4 shows that according to the character recognition system and method embodying the present invention the humming distance among these characters "0" though "9" becomes two or more to remarkably improve the accuracy of character recognition with only one exception, i.e., that between the characters "4" and "9". Moreover, the character "4" as shown in FIG. 2b has a clear and definite distinction from the character "9" due to the presence and absence of the segment Sd of the segmented font of FIg. 3b to facilitate recognition of the characters "4" and "9". The character "7" shown therein also may be recognized easily because the segment Sf of FIG. 3b is not utilized for judgement.

The character recognition system and method of the present invention will be described in more detail with reference to the illustrative embodiments.

FIG. 3a illustrates alignment of twenty radius vectors $Za_1, Za_2, Zb_1, \ldots Zj_2$ for determining the character normalization as illustrated in FIG. 3b, the radius vectors extending out from each of the constraining dots 1a and 1b. Comparision of FIGS. 3a and 3b shows that each of the respective segments Sa, Sb, ... Sj is identified by two radius vectors $(Za_1, Za_2), (Zb_1, Zb_2) \ldots (Zj_1, Zj_2)$. The following expresses logical formulas for judging the respective segments Sa, Sb, ... Sj by means of the radius vectors.

$$\begin{aligned} Sa &= Za_1 \cdot Za_2 \\ Sb &= Zb_1 + Zb_2 \\ Sc &= Zc_1 \cdot Zc_2 \\ Sd &= Zd_1 \cdot Zd_2 \\ Se &= Ze_1 + Ze_2 \\ Sf &= Zf_1 \cdot Zf_2 \\ Sg &= Zg_1 \cdot Zg_2 \\ Sh &= Zh_1 \cdot Zh_2 \\ Si &= Zi_1 \cdot Zi_2 \\ Sj &= Zj_1 \cdot Zj_2 \end{aligned} \quad (2)$$

In other words, the segment Sa is expressed by the logical product of the radius vectors $Za_1$ and $Za_2$ while the segment Sb is expressed by the logical sum of the radius vectors $Zb_1$ and $Zb_2$. This judgment results in improvements in accuracy of character recognition.

Figure 5:
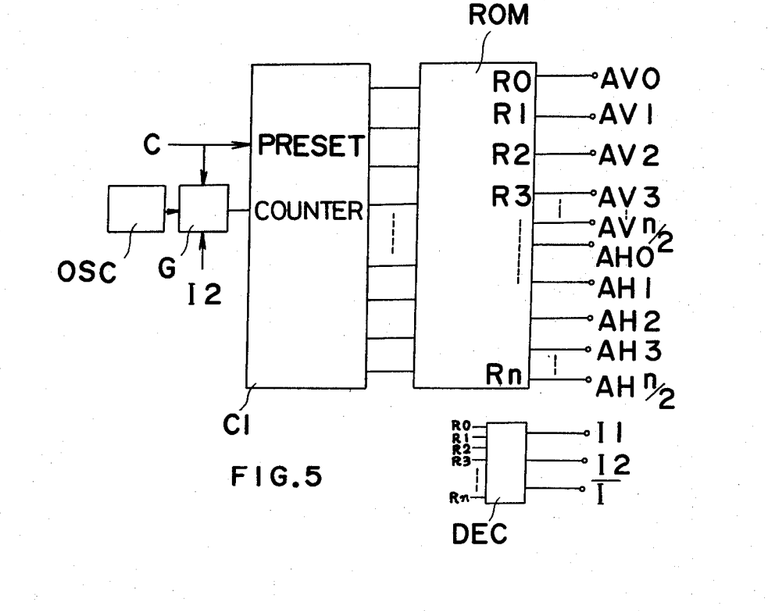
FIGS. 5 and 6 are circuit block diagrams showing a character recognition circuit construction of one embodiment of the present invention.

FIG. 5 illustrates a circuit for generating the address of the respective radius vectors $Za_1 \ldots Zj_2$ as illustrated in FIG. 3a, which comprises mainly a counter $C_1$, a read-only memory ROM for generation of the vector addresses and a decoder DEC for generation of various instructions stored in the ROM. As depicted diagramatically in FIG. 7a, the memory ROM stores addresses of the radius vectors $Za_1, Za_2, \ldots Zj_2$ of FIG. 7b in sequence. Storage instructions $I_1$ are stored following each of the respective last addresses of each radius vector and a stop instruction $I_2$ for the counter $C_1$ is stored in the ROM, following the whole of a succession of the vector addresses. The decoder DEC serves to take out the instructions $I_1$ and $I_2$ from the ROM outputs Ro-Rn. These instructions $I_1$ and $I_2$ are written into a region of the ROM (for example, the region i suggested in FIG. 7b) having an address which is not useful for character recognition. The instruction $\overline{I}$ from decoder DEC represents all outputs from the ROM occurring at times other than when instructions $I_1$ and $I_2$ are generated, namely, $\overline{I} = \overline{I_1 + I_2}$. The use of instruction $\overline{I}$ will become more readily apparent by reference to the following description of FIG. 6.

The counter $C_1$ increments the addressing of ROM in response to each of the pulses applied via a gate G from an oscillator OSC, and also assigns the initial address to any desired position in response to a control signal C applied externally, if necessary.

Figure 6:
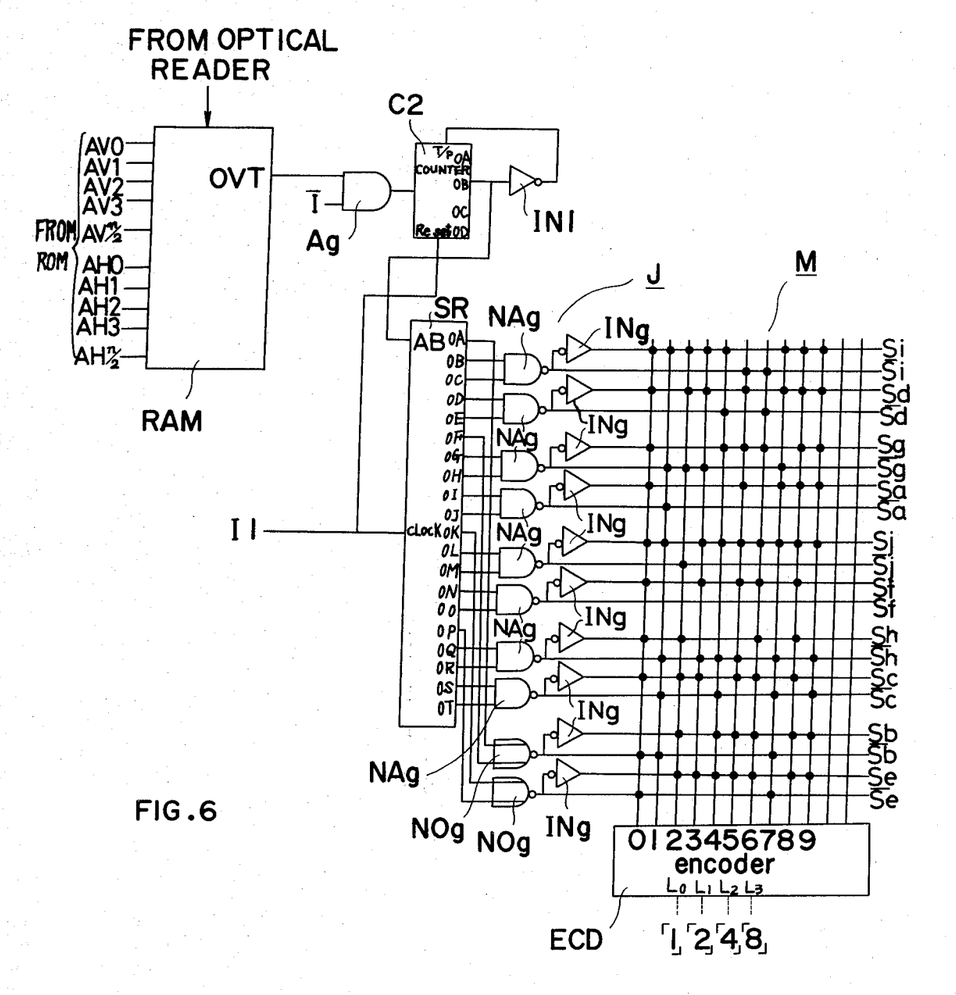

FIGS. 5 and 6 together comprise a character recognition circuit, which includes a random access memory RAM on which there are written the normalized patterns of the respective characters to be read and identified, a shift register SR, a character recognition logic circuit J and a matrix circuit M. The designation of the vertical and horizontal addresses $Av_0, Av_1 \ldots Av_{n/2}$, $A_{H0}, A_{H1}, \ldots A_{Hn/2}$ is provided by the outputs $R_0, R_1 \ldots R_n$ of ROM to select the addresses of the respective radius vectors. The outputs of RSM are supplied via an AND gate Ag to a counter $C_2$ together with the instruction $\overline{I}$ (indicating that ROM provides no address from the region i, viz., $\overline{I_1 + I_2}$). In other words, instruction $\overline{I}$ enables AND gate Ag to pass output information from the RAM for each incremented output of the ROM except during instruction periods $I_1$ or $I_2$, since instructions $I_1, I_2$ are merely reset signals for counters $C_2$ and $C_1$, respectively.

The counter $C_2$ determines whether the respective radius vectors stored in the ROM coincide with the associated segments of the detected normalized character pattern stored in the RAM either completely or incompletely. In the embodiment illustrated herein, when the count of the counter $C_2$ reaches two indicating coincidence of two radius vectors such as $Za_1, Za_2$ with character information stored in the RAM, the output $O_B$ is held at a high level so that the counter $C_2$ is inhibited to count upon application of the output $O_B$ to its terminal T/P via an inverter $IN_1$. In other words, the counter $C_2$ determines whether the inputs thereto are either two or more or one or less. Consequently, the presence or absence of the predetermined radius vectors which are crossed by the characters to be identified, is confirmed by determinations as to whether read out character signals or these crossings are sensed at the two addresses of that vector such as $Za_1, Za_2$ of Vector Za. The inputs to the counter $C_2$ are processed as noise if the count is only one. The counter $C_2$ is reset by the storage instruction $I_1$ indicating the end of an address scan of a particular radius vector pair such as $Za_1, Za_2$.

It should be understood that counter $C_2$ merely counts the number of coincidences. The coincidences per se are detected by the ROM-RAM combination in the following manner. The RAM of FIG. 6 is sequenced in synchronism with the ROM to read out information stored in the RAM at locations corresponding to the radius vector information stored in the ROM. This is indicated diagramatically in FIG. 6 by the presence of address information ($Av_0$ to $Av_{n/2}$ and $A_{H0}$ to $A_{Hn/2}$) from the ROM of FIG. 5 to the input terminals of the RAM of FIG. 6. In other words, as counter $C_1$ increments the addresses of the ROM of FIG. 5, the outputs of the ROM applied to the RAM, address the RAM only at those same address locations generated by the ROM. Since the address information generated by the ROM corresponds to a radius vector pattern, such as that of FIG. 3a, and the RAM is addressed only at those vector locations, the presence of any stored data in those locations is an indication of the coincidence or correspondence of character data in the RAM to the vector pattern stored in the ROM. Counter $C_2$ counts the number of such coincidences in the manner described above. As stated hereinbefore, it is a preferred criteria of the present invention that two such coincidences for each radius vector occur to positively indentify that segment of the character. Therefore, it is the function of counter $C_2$ to determine if that criteria has been met.

Figure 7A:
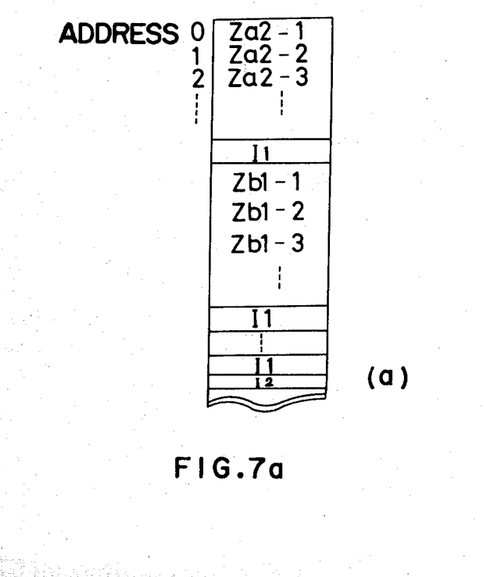
FIGS. 7a and 7b are illustrations for the purpose of explanation of the operation of the circuit of FIGS. 5 and 6.
Figure 7B:
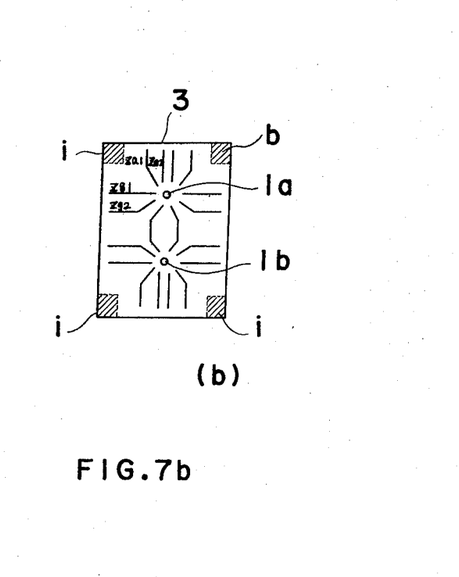

A more complete understanding of the present invention may be obtained by reference to FIGS. 7a and 7b.

Reverting now to FIG. 7a, upon completion of determinations concerning the addresses $Za_1$, $Za_2$, ... of the first vector Za, the instruction $I_1$ from decoder DEC of the ROM of FIG. 5 places the counter $C_2$ into its reset condition such that the counter $C_2$ is ready for the counting of the next succeeding vector Zb including segments $Zb_1$, $Zb_2$. Under these circumstances the contents of the counter $C_2$ for each radius vector (either a "1" or "0") are transferred to the shift register SR upon receipt of the instruction $I_1$. When the counting of the coincident radius vector information Zb is completed (under control of the address information in the ROM), the count of the counter $C_2$ (either a "1" or "0" at $O_b$) is transferred to the shift register SR in a like manner while the previous contents of the shift register SR are shifted to the next succeeding bit positions. In this manner the counts as to all the radius vectors $Za_1$, $Za_2$, $Zb_1$, ... $Zj_2$ expressed as logic "1" or "0" are loaded into the shift register SR serially. After completion of determinations as to all the radius vectors, the stop instruction $I_2$ is derived from the ROM, as illustrated schematically in FIG. 7a, to close the gate G to the counter $C_1$ of FIG. 5 and to terminate such character crossing determination procedure.

Thereafter, the contents of the shift register SR representative of the presence and absence of the crossings or coincidences are transmitted via the output terminals $O_A$, $O_B$, $O_C$ ... $O_T$ to the logic circuit J and then to the matrix circuit M in order to provide character identification. The shift register SR is of the serial input, parallel output type. The logic circuit J is constituted by a NAND gate NAg, a NOR gate NOg and an inverter INg connected pursuant to the logical formulas (2) mentioned hereinbefore for determining the character font segments of FIG. 3b. The matrix circuit M is diode-wired in accordance with the truth table of FIG. 4. As a result, the contents of the shift register SR are processed by means of the logic circuit J and the matrix circuit M to recognize and identify the respective characters. The results are introduced into an encoder ECD which converts its inputs into binary coded signals, the binary signals being transmitted via its output terminals $L_0$, $L_1$, $L_2$ and $L_3$.

The respective characters handwritten on the medium are recognized and identified in the above described manner. It will be understood easily from analysis of FIG. 3a that the vector alignment is symmetric with respect to the center. Therefore, for example, the memory ROM is adapted to store only the vector information concerning the third quadrant of the vector alignment such that it is made possible to generate addresses for all the radius vectors by proper inversion of these addresses. This permits utilization of a read only memory of small capacity.

Referring further to the logic circuit J and the matrix M of FIG. 6, these circuits in combination comprise a crossing-to-segment converter. That is a converter which correlates the crossing of radius vectors with the character stored in the RAM to like crossings with a normalized segmented font such as illustrated in FIG. 3b. The AND gates NAg, the NOR gates NOg, and inverters INg assure that each segment Sa-Sj is determined by at least two radius vectors in accordance with logic formulas (2) defined hereinbefore. This provides the logic signals related to the presence (Sa) or absence ($\overline{Sa}$) of a segment such as Sa of the character font of FIG. 3b. These logic signals for each respective segment are in effect introduced into the truth table of FIG. 4 by means of the diode-wired matrix M. A binary number identifying the character being read is outputted of matrix M via encoder ECD of FIG. 6.

Thus, each segment of the normalized font of FIG. 3b is identified under two accuracy increasing criteria:
(1) Each radius vector must have at least two crossings or coincidences with the character read into the RAM to establish the existence of a crossing, thereof, as determined by counter $C_2$; and
(2) The existence of each segment of the normalized font is identified by logic circuit J and matrix M only when two predetermined radius vectors cross each font segment.

Accordingly, counter $C_2$ increases the accuracy of character detection and logic circuit J and matrix M further increase the accuracy beyond that provided by counter $C_2$.

Although the above description of the present invention should be adequate to enable one of ordinary skill in the art to practice applicants' invention, the following description of FIGS. 8 to 11 provide an additional example of the operation of the character identification method and apparatus of the present invention.

Figure 8:
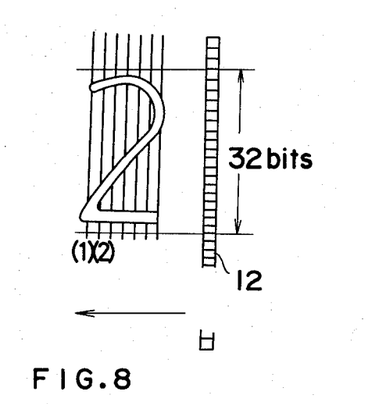
FIGS. 8 and 9 are diagramatic examples of the use of a photoelectrical line sensor for scanning and detecting handwritten character information in accordance with the present invention.
Figure 9:
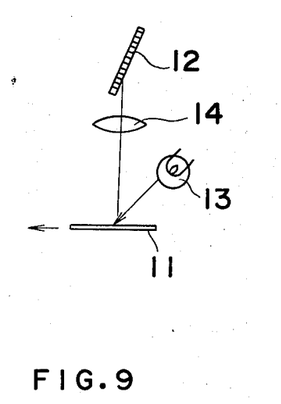

Referring in detail to FIGS. 8 and 9, there is illustrated an optical scanner suitable for reading handwritten character information in accordance with the present invention. The optical scanner comprises conventional opto-electrical transducers for sensing an optical image such as the character "2" on a paper or other record medium, which converts the optical image into a corresponding electrical signal image. The opto-electrical transducer 12 may comprise a commercially available photoelectrical line sensor of 512 bits available from Reticon, Inc. However, it should be understood that other well known character readers, such as Flying-Spot Scanners and Television cameras, may also be used for reading out character information. In FIGS. 8 and 9, the opto-electrical transducer comprises a linear array of photocells 12 which may be photodiodes disposed along a linear path having a field of view of 32 bits of information in the vertical direction of the character 2. Intense light from light source 13 is focused onto the record media containing the character 2, as indicated in FIG. 9, and light emitted therefrom is reflected from the record media through focusing lens 14 onto the linear photodiode array 12. As indicated by the direction of the arrows at the base of FIGS. 8 and 9 the photodiode array 12 is scanned across the character 2 thus, in effect, providing a raster scan of the character.

The photodiode sensor 12 allows current to flow in each of the respective diodes upon receipt of light but does not supply current in said respective photodiodes in the absence of the receipt of light. That is, no current is developed at dark areas at the reflective light image, namely, where intelligence is marked on the record media. However, current flow will occur in the photodiodes which are optically aligned with the regions of the record media where the intelligence is not marked. Therefore, in the case of optical character recognition techniques of the present invention, it will be assumed that dark areas, or those areas marked with segments of a character, are defined by a logic "1" and white background areas are defined by a logic "0" at the respective outputs of the individual photodiodes of the sensor array 12.

Accordingly, a line (1) of intelligence passing through the character 2, as depicted in FIG. 8, can be sensed by the linear photo sensor array 12 and as the record medium and the sensor array are relatively moved, the next line of intelligence (2) of the character "2" is read out. The read out continues along 32 vertical lines parallel to line (1) and (2) and a line-by-line conversion develops an overall pattern of 32 by 32 bits in the form of logic signals "1" and "0", which are in turn stored in the RAM of FIG. 6, or the RAM of FIG. 10 to be discussed hereinafter.

Figure 10:
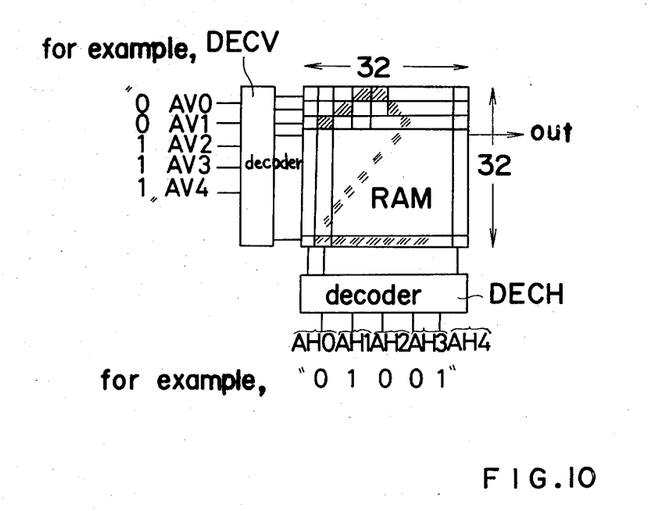
FIG. 10 is a diagramatic view of the RAM of FIG. 6 having the character "2" stored or read thereinto by the photoelectric line sensor of FIGS. 7 and 8.
Figure 11:
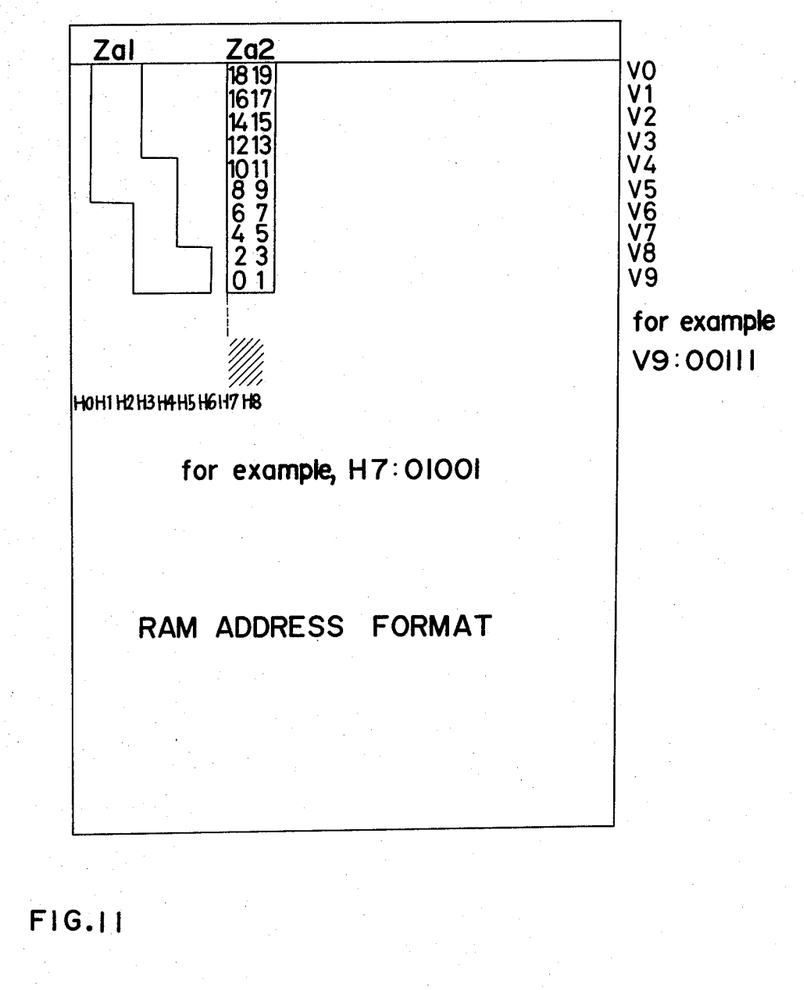
FIG. 11 is a diagramatic illustration of how radius vector information is stored in the ROM of FIG. 5 and read out from the RAM of FIG. 6.

FIGS. 10 and 11 show a specific example of how a character such as the numeral "2" is stored in a RAM of the present invention and how the information in the RAM is addressed or read out from the RAM in accordance with the radius vector address information patterns stored in the ROM of FIG. 5, as discussed hereinbefore.

As illustrated in FIG. 10, the RAM comprises a memory of one K bits which is a 32×32 bit matrix. As illustrated in FIG. 10 the character "2" is stored in the RAM in the form of logic "1's" and "0's". Vertical address signals $AV_0$, $AV_1$, $AV_2$, $AV_3$, $AV_4$, etc. are applied through a decoder $DEC_V$ to the vertical input of the RAM from the output of a ROM such as that of FIG. 5. In a like manner, horizontal address signals $AH_0$, $AH_1$, $AH_2$, $AH_3$, $AH_4$, etc. are applied through a decoder $DEC_H$ from the ROM of FIG. 5 to the horizontal inputs of the RAM. Therefore, the only information addressed into the RAM corresponds to the address position of the radius vectors stored in the ROM of FIG. 5. Accordingly, the only information read out of the RAM of FIG. 10 is information stored in the RAM which is coincident with the address locations stored in the ROM. The output signal of the RAM of FIG. 10 is then fed through an AND gate Ag, such as that of FIG. 6, to the counter $C_2$ of that Figure. In this manner when the signals of "1" and "0" in the RAM of FIG. 10 are coincident with the address of the respective radius vectors stored in the ROM of FIG. 5 at least twice for a given radius vector, it is determined that the character intelligence is in contact with, or crosses that radius vector.

FIG. 11 illustrates a specific example of information retrieval of data stored in the RAM of FIG. 10. More specifically, FIG. 11 illustrates the address locations of the radius vectors $Za_1$, $Za_2$ of a radius vector pattern such as those of FIGS. 3a and 7b superimposed over the storage locations of data in the RAM. In other words, since the read out of data from the RAM is controlled by the address locations of the ROM, the data read out from the RAM corresponds only to address locations therein which correspond with radius vector address locations in the ROM. It will be noted, for example, that the radius vector $Za_2$ has 20 sub-address locations numbered 0-19 in the RAM. Each of these 20 sub-address locations with respect to radius vector $Za_2$ also have matrix address locations defined by numerals $H_0$ to $H_8$, etc. and $V_0$ to $V_9$, etc. as illustrated in FIG. 11.

Turning to a specific example, the detection of data in the RAM within the address location of a specific radius vector $Za_2$ is detected in the following manner. Assume that the counter $C_1$ which increments the ROM of FIG. 5 specifies first the address "0" for the ROM. Then the corresponding position of the "0" of radius vector $Za_2$ in the RAM address format of FIG. 11 can be represented by the matrix coordinate designation $V_9$ and $H_7$ (column $V_9$, row $H_7$). The row $V_9$ location, for example, as illustrated in FIG. 10 and FIG. 11 can be represented in binary form by five bits of the ROM outputs $AV_0$, $AV_1$, $AV_2$, $AV_3$, $AV_4$. This is represented by the binary number 00111 illustrated in FIG. 10. In a like manner, the column address location $H_7$ may be represented in binary form by five bits of $AH_0$ to $AH_4$ as 01001. As illustrated, these address codes from the ROM of FIG. 5 are applied to the inputs of the RAM of FIGS. 6 and 9. For the character 2 stored in the RAM of FIG. 10, the outputs of the RAM are "0" for the addresses within the location of radius vector $Za_2$, for the addresses numbered 0-17 in FIG. 11 and the outputs are "1" for the addresses 18 and 19 which would contain data with respect to the top portion of the character 2 which crosses address locations 18 and 19. Thus, as the address locations 0-19 of radius vector $Za_2$ are successively scanned in the RAM under the control of the ROM, the presence of character information at locations 18 and 19 outputs one count for each location through AND gate Ag of FIG. 6 to the counter $C_2$.

As stated hereinbefore, the counter $C_2$ discontinues counting if two or more inputs are applied, the occurrence of more than two counts being redundant to the character indentification of the present invention. Thus, the output $O_B$ from the counter $C_2$ assumes the logic value 1, when the coincidence of data stored in the RAM for any given radius vector segment such as $Za_2$ occurs at two or more addresses within that radius vector. This output $O_B$ is applied to the shift register SR to apply a logic "1" thereto when the crossings of the radius vector with the data stored in the RAM are detected twice or more. In this manner, all of the address locations associated with the vector $Za_2$, as controlled by ROM, are scanned or read out of the RAM. As discussed hereinbefore, at the end of a particular vector scan the signal $I_1$ is applied to counter $C_2$ to clear and reset it for detection of the next radius vector to be addressed or scanned. As counter $C_2$ is cleared by signal $I_1$ it transfers the derived detection logic values "1" and "0" indicating the presence or absence of coincidence between the data stored in the RAM and the address locations of the ROM into shift register SR. The counter $C_1$ then increments the ROM for the detection of the next radius vector, for example, $Za_1$. At the end of the scan of all radius vectors, the instruction $I_2$ as discussed hereinbefore resets the counter $C_1$ via GATE G. If all of the address outputs associated with the radius vectors through, for example, $Zj_2$ are addressed in the RAM in the above manner, the ROM provides an END mark (signal $I_2$). Upon completion of the END mark the output of the encoder ECD of FIG. 6 is latched whereby $L_0$, $L_1$, $L_2$ and $L_3$ store, eventually recognize, and code character intelligence corresponding to the character "2" in the above example of FIGS. 8 to 11.

The above discussed character recognition procedure may be summarized as follows: A succession of character signals optically read out by means of a sensing head are stored in a RAM and read out in accordance with address information in a ROM representative of a predetermined character radius vector pattern and then combinations of coincidence between the stored pattern in the RAM at the address locations supplied from the ROM are supplied to the translator and logic circuit M, the resultant identification being then sent to a utilization circuit.

While only certain embodiments of the present invention have been described, it will be apparent to those skilled in the art that various changes and modifications may be made therein without departing from the spirit and scope of the invention as claimed.

It is claimed:

1. A method of identifying an alpha-numeric handwritten character comprising the steps of:

forming said handwritten character within a predetermined area, said area being divisible into definable regions by a first reference pattern containing first and second spaced constraining dots and a plurality of radius vector means, extending from the region of each of said constraining dots, each of said radius vector means having at least two vector segments, said radius vector means extending from said first constraining dot including six vertical radius vector segments including four radius vector segments $Za_1$, $Za_2$, $Zd_1$, $Zd_2$ extending upwardly from said first constraining dot and two radius vector segments $Zb_1$, $Ze_1$, extending downwardly from said first constraining dot toward said second constraining dot and four horizontal radius vector segments including two radius vector segments, $Zg_1$, $Zg_2$, extending from one side of said first constraining dot and two radius vector segments, $Zi_1$, $Zi_2$ extending from the opposite side of said first constraining dot, said radius vector means extending from said second constraining dot including six vertical radius vector segments including four radius vector segments $Zc_1$, $Zc_2$, $Zf_1$, $Zf_2$ extending downwardly from said second constraining dot and two radius vector segments $Zb_2$, $Ze_2$ extending upwardly from said second constraining dot toward said first constraining dot and four horizontal radius vector segments including two radius vector segments $Zh_1$, $Zh_2$ extending from one side of said second constraining dot and two radius vector segments $Zj_1$, $Zj_2$ extending from the opposite side of said second constraining dot, said area also being divisible into definable regions by a second reference pattern in the form of a character font consisting of horizontal and vertical font segments including six horizontal font segments Sa, Sd, Sb, Se, Sc, Sf and four vertical font segments, Sg, Si, Sh, Sj, said font segments collectively forming a figure eight configuration, each character to be idenfified having a shape which can be approximated by a predetermined combination of font segments, the identity and location of each font segment in said area being definable by conditions of coincidence of portions of said handwritten character with predetermined pairs of said radius vector segments, detecting which predetermined pairs of said radius vector segments have portions which are coincident with portions of said handwritten character formed in said area to establish said conditions of coincidence and to identify those font segments satisfying said conditions of coincidence from the following logic equations:

$$Sa = Za_1 \cdot Za_2$$
$$Sb = Zb_1 + Zb_2$$
$$Sc = Zc_1 \cdot Zc_2$$
$$Sd = Zd_1 \cdot Zd_2$$
$$Se = Ze_1 + Ze_2$$
$$Sf = Zf_1 \cdot Zf_2$$
$$Sg = Zg_1 \cdot Zg_2$$
$$Sh = Zh_1 \cdot Zh_2$$
$$Si = Zi_1 \cdot Zi_2$$
$$Sj = Zj_1 \cdot Zj_2$$

identifying said handwritten character by correlating the identified font segments with said predetermined combinations of font segments to determine the approximate shape of said handwritten character, and therefore, the identity thereof.

2. The method of claim 1 comprising detecting only said predetermined pairs wherein at least two points of coincidence exist for each respective radius vector segment with said portions of said handwritten character.

3. A system of identifying an alpha-numeric handwritten character formed in a predetermined area comprising:

first reference pattern means for dividing said predetermined area into definable regions, said pattern containing first and second spaced constraining dots and a plurality of radius vector means extending from the region of each of said constraining dots, each of said radius vector means having at least two vector segments;

second reference pattern means also dividing said predetermined area into definable regions, said second reference pattern means being in the form of a character font consisting only of horizontal and vertical font segments, said character font having first and second sets of said font segments for approximating the shape of upper and lower halves of a character, respectively, said first set being substantially symetrically disposed about said first constraining dot and said second set being substantially symetrically disposed about said second constraining dot, each character to be identified having a shape which can be approximated by a predetermined combination of font segments, the identity and location of each font segment in said area being definable by conditions of coincidence of portions of said handwritten character with predetermined pairs of said radius vector segments;

means for detecting which predetermined pairs of said radius vector segments have portions which are coincident with portions of said handwritten character formed in said area to establish said conditions of coincidence and to identify those font segments corresponding to said conditions of coincidence, said means for detecting only detecting said predetermined pairs when at least two points of coincidence exist for each respective radius vector segment with said portions of said handwritten character; and means for identifying said handwritten character by correlating the identified font segments with said predetermined combinations of font segments to determine the approximate shape of said handwritten character and therefore, the identity thereof.

4. A system for identifying an alpha-numeric handwritten character formed in a predetermined area comprising;

first reference pattern means for dividing said predetermined area into definable regions, said first reference pattern means containing first and second spaced constraining dots and a plurality of radius vector means, extending from the region of each of said constraining dots, each of said radius vector means having at least two vector segments, said radius vector means extending from said first constraining dot including six vertical radius vector segments including four radius vector segments $Za_1$, $Za_2$, $Zd_1$, $Zd_2$ extending upwardly from said first constraining dot and two radius vector segments $Zb_1$, $Ze_1$, extending downwardly from said first constraining dot toward said second constraining dot, and four horizontal radius vector segments including two radius vector segments, $Zg_1$, $Zg_2$, extending from one side of said first constraining dot and two radius vector segments $Zi_1$, $Zi_2$ extending from the opposite side of said first constraining dot, said radius vector means extending from said second constraining dot including six vertical radius vector segments including four radius vector segments $Zc_1$, $Zc_2$, $Zf_1$, $Zf_2$ extending downwardly from said second constraining dot and two radius vector segments $Zb_1$, $Ze_1$ extending upwardly from said second constraining dot toward said first constraining dot and four horizontal radius vector segments including two radius vector segments $Zh_1$, $Zh_2$ extending from one side of said second constraining dot and two radius vector segments $Zj_1$, $Zj_2$ extending from the opposite side of said second constraining dot, said reference pattern means for dividing said predetermined area into definable regions, said second reference pattern means being in the form of a character font consisting of horizontal and vertical font segments including six horizontal font segments Sa, Sd, Sb, Se, Sc, Sf, and four vertical font segments, Sg, Si, Sh, Sj, said font segments collectively forming a figure eight configuration, each character to be identified having a shape which can be approximated by a predetermined combination of font segments, the identity and location of each font segment in said area being definable by conditions of coincidence of portions of said handwritten character with predetermined pairs of said radius vector segments, means for detecting which predetermined pairs of said radius vector segments have portions which are coincident with portions of said handwritten character formed in said area to establish said conditions of coincidence and to identify those font segments satisfying said conditions of coincidence from the following logic equations:

$$Sa = Za_1 \cdot Za_2$$
$$Sb = Zb_1 + Zb_2$$
$$Sc = Zc_1 \cdot Zc_2$$
$$Sd = Zd_1 \cdot Zd_2$$
$$Se = Ze_1 + Zd_2$$
$$Sf = Zf_1 \cdot Zf_2$$
$$Sg = Zg_1 \cdot Zg_2$$
$$Sh = Zh_1 \cdot Zh_2$$
$$Si = Zi_1 \cdot Zi_2$$
$$Sj = Zj_1 \cdot Zj_2$$

means for identifying said handwritten character by correlating the identified font segments with said predetermined combinations of font segments to determine the approximate shape of said handwritten character, and therefore, the identity thereof.

5. The system of claim 4 wherein said means for detecting only detects said predetermined pairs when at least two points of coincidence exist for each respective radius vector segment with said portions of said handwritten character.

6. The method of claim 3 or 4 said character font including ten font segments.

7. The method of claim 6, wherein said ten font segments include three parallel pairs of horizontal font segments, the horizontal font segments of each of said pairs being disposed in end-to-end alignment and four vertical font segments so positioned across the ends of said parallel pairs of horizontal font segments to form a figure eight configuration.

8. The system of claims 3 or 4 further comprising:

first memory means for electronically storing said first reference pattern in a two dimensional storage array;

reader means for scanning said predetermined area and generating electrical signals representing the locations of portions of said handwritten character formed in said predetermined area;

said means for detecting including,
second memory means for storing the electrical signals generated by said reader means in a two dimensional storage array,
means for addressing said second memory means only at positions corresponding to the two dimensional storage positions of said first memory means in which said first reference pattern is stored to thereby detect conditions of coincidence between said portions of said handwritten character and portions of said first reference pattern,
logic circuit means responsive to said conditions of coincidence for establishing which predetermined pairs of said radius vector segments are coincident with said portions of said handwritten character;

said means for identifying including,
matrix means responsive to said logic circuit means for determining which font segments have been identified by said predetermined pairs of said radius vectors, and
means responsive to said matrix means and the font segments identified thereby for generating an output signal representative of said handwritten character.

9. The system of claim 8 wherein said first memory means is a read only memory (ROM) and said second memory means is a random access memory (RAM).

10. The system of claim 9 wherein said logic circuit means includes counter means coupled to said second memory means for establishing minimum standard criteria for the existence of a condition of coincidence between positions of said handwritten character and each radius vector segment of said first reference pattern, said minimum standard criteria being the occurrence of at least two points of coincidence with each radius vector segment, said counter means generating an output pulse for each vector segment only after the receipt of at least two output pulses representing said at least two points of coincidence from an addressable region of a single radius vector segment.

11. A system of identifying an alpha-numeric character formed in a predetermined area comprising:

first reference pattern means for dividing said predetermined area into definable regions, said pattern containing first and second spaced constraining dots and a plurality of radius vector means extending from the region of each of said constraining dots, each of said radius vector means having at least two vector segments;

second reference pattern means also for dividing said predetermined area into definable regions, said second reference pattern means being in the form of a character font consisting only of horizontal and vertical font segments, said character font having first and second sets of said font segments for approximating the shape of upper and lower halves of a character, respectively, said first set being substantially symetrically disposed about said first constraining dot and said second set being substantially symetrically disposed about said second constraining dot, each character to be identified having a shape which can be approximated by a predetermined combination of font segments, the identity and location of each font segment in said area being definable by conditions of coincidence of portions of said handwritten character with predetermined pairs of said radius vector segments;

first memory means for electrically storing said first reference pattern in a two dimensional storage array;

optical reader means for scanning said predetermined area and generating electrical signals representing the locations of portions of said handwritten character formed in said predetermined area;

second memory means for storing the electrical signals generated by said reader means in a two dimensional storage array;

means for addressing said second memory means only at positions corresponding to the two dimensional storage array positions of said first memory means in which said first reference pattern is stored to thereby detect conditions of coincidence between said portions of said handwritten character and portions of said first reference pattern;

logic circuit means responsive to said conditions of coincidence for generating output signals representative of which font segments have been identified by said predetermined pairs of said radius vector segments; and responsive to the output signals of said logic circuit means for generating an output signal representative of said handwritten character.

12. The system of claim 1 wherein said first memory means is a read only memory (ROM) and said second memory means is a random access memory (RAM).

13. The system of claim 12 wherein said logic circuit means includes counter means coupled to said second memory means for establishing minimum standard criteria for the existence of a condition of coincidence between portions of said handwritten character and each radius vector segment of said first reference pattern, said minimum standard criteria being the occurrence of at least two points of coincidence for each radius vector segment, said counter means generating an output pulse for each vector segment only after the receipt of at least two output pulses representing said at least two points of coincidence from said second memory means from an addressable region of a single radius vector segment.

* * * * *